(12) United States Patent
Bennati et al.

(10) Patent No.: US 11,919,497 B2
(45) Date of Patent: Mar. 5, 2024

(54) SYSTEMS AND METHODS TO ASSIST MANEUVERING OF A TRAILER BEING TOWED BY A VEHICLE

(71) Applicant: GM GLOBAL TECHNOLOGY OPERATIONS LLC, Detroit, MI (US)

(72) Inventors: Bruno Bennati, Flat Rock, MI (US); Steven Reini, Waterford, MI (US); Halit Zengin, Bowmanville (CA); Manvir Dulai, Brampton (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 228 days.

(21) Appl. No.: 17/538,638

(22) Filed: Nov. 30, 2021

(65) Prior Publication Data

US 2023/0166700 A1    Jun. 1, 2023

(51) Int. Cl.
| | |
|---|---|
| *B60T 8/17* | (2006.01) |
| *B60D 1/24* | (2006.01) |
| *B60R 1/26* | (2022.01) |
| *B60T 7/20* | (2006.01) |
| *B60T 8/171* | (2006.01) |
| *B60T 8/172* | (2006.01) |
| *B60T 8/1755* | (2006.01) |
| *B62D 53/04* | (2006.01) |

(52) U.S. Cl.
CPC ............ *B60T 8/1701* (2013.01); *B60D 1/242* (2013.01); *B60R 1/26* (2022.01); *B60T 7/20* (2013.01); *B60T 8/171* (2013.01); *B60T 8/172* (2013.01); *B60T 8/17551* (2013.01); *B62D 53/04* (2013.01); *B60R 2300/302* (2013.01); *B60R 2300/806* (2013.01); *B60R 2300/8086* (2013.01); *B60T 2220/03* (2013.01); *B60T 2240/00* (2013.01); *B60T 2250/03* (2013.01)

(58) Field of Classification Search
CPC ....... B60T 8/1708; B60T 13/662; B60T 8/885
See application file for complete search history.

(56) References Cited

U.S. PATENT DOCUMENTS

| | | | | |
|---|---|---|---|---|
| 4,685,745 | A | * | 8/1987 | Reinecke ................. B60T 17/18 303/191 |
| 2022/0161770 | A1 | * | 5/2022 | Brinkman .............. B60T 8/1887 |
| 2023/0146431 | A1 | * | 5/2023 | Gordon ................. B60W 10/30 701/41 |

OTHER PUBLICATIONS

Brinkman, Todd J. et al,. U.S. Appl. No. 17/102,983. Systems for Anti-Lock Braking for a Tow Vehicle. filed Nov. 24, 2020.
Marmara, Stacey M., U.S. Appl. No. 17/106,952. Trailer to Vehicle Integral Current Draw Management. filed Nov. 10, 2020.

* cited by examiner

*Primary Examiner* — John Kwon
(74) *Attorney, Agent, or Firm* — Lorenz & Kopf LLP (57) ABSTRACT

Methods and systems to assist maneuvering of a trailer being towed by a vehicle. The trailer includes a left wheel, a right wheel, an axle, a left brake device coupled to the left wheel, and a right brake device coupled to the right wheel. The methods and systems receive a driver command for a target path for the trailer, determine a left braking torque for the left wheel and a right braking torque for the right wheel based on the target path so as to provide for differential braking, and apply, via the left brake device and the right brake device, the left braking torque and the right braking torque to assist maneuvering of the trailer along the target path.

20 Claims, 7 Drawing Sheets

SYSTEMS AND METHODS TO ASSIST MANEUVERING OF A TRAILER BEING TOWED BY A VEHICLE

The present disclosure generally relates to vehicles, and more particularly relates to assisting a driver in maneuvering of a trailer being towed by a vehicle.

Various vehicles may serve as tow vehicles for towing a trailer. Some vehicle and trailer systems allow a driver to command application of brakes of the trailer using a mechanical interface provided in the vehicle. The brakes of all wheels of the trailer are applied at the same time and at the same magnitude in such systems. Vehicle and trailer brakes can be used in conjunction to ensure a smooth braking operation of the combined system. Trailer brakes can be useful in mitigating against trailer sway conditions.

Controlling a maneuver (e.g. reversing) of a trailer from the vehicle requires skill on the part of the driver and can be a complicated operation. One known problem that can occur is jackknifing. Jackknifing during a backing up maneuver of a trailer occurs when the hitch angle increases to a point such that the vehicle and trailer fold together about the hitch point like a jackknife. If the backward motion is continued, the jackknife effect progressively worsens, until the vehicle and trailer are in physical contact with each other. Jackknifing can result in traffic disruptions and wasted time, and can potentially cause damage or personal injury.

Accordingly, it is desirable to provide improved systems and methods for maneuvering a vehicle and trailer combination along a desired trajectory. It is also desirable to provide methods and systems that are simple for a driver to use. Furthermore, other desirable features and characteristics of the present invention will be apparent from the subsequent detailed description and the appended claims, taken in conjunction with the accompanying drawings and the foregoing technical field and background.

SUMMARY

In one aspect, a method is provided to assist maneuvering of a trailer being towed by a vehicle. The trailer includes a left wheel, a right wheel, an axle, a left brake device coupled to the left wheel and a right brake device coupled to the right wheel. The left and right wheels are located on opposed ends of the axle. The method includes: receiving, via a processor, a driver command for a target path for the trailer, determining, via the processor, a left braking torque for the left wheel and a right braking torque for the right wheel based on the target path so as to provide for differential braking, applying, via the left brake and the right brake, the left braking torque and the right braking torque to assist maneuvering of the trailer along the target path.

In embodiments, the driver command for the target path is derived from a driver input device of the vehicle.

In embodiments, the driver command for the target path is derived from a steering input device of the vehicle that sets a current path of the trailer and a second input device of the vehicle that modifies the current path to provide the target path.

In embodiments, the trailer includes a video capture device for videoing an external scene behind the trailer and providing a corresponding video feed, and wherein the second input device is a Human Machine Interface (HMI) that receives and displays the video feed from the video capture device, integrates a depiction of the current path into the video feed for display and allows driver input of a modification to the current path.

In embodiments, the method includes determining, via the processor, a target trajectory for the target path, wherein determining the left brake torque and the right brake is based on the target trajectory for the target path.

In embodiments, the trailer comprises a left wheel speed sensor and a right wheel speed sensor and an Inertial Measurement Unit (IMU). The method includes: receiving, via the processor, a measured left wheel speed from the left wheel speed sensor, receiving, via the processor, a measured right wheel speed from the right wheel speed sensor, determining, via the processor, a target yaw rate for the trailer based on the driver command, deriving a target left wheel speed based on the target yaw rate, deriving a target right wheel speed based on the target yaw rate, determining, via the processor, the left braking torque based on a difference between the target left wheel speed and the measured left wheel speed, and determining, via the processor, the right braking torque based on a difference between the target right wheel speed and the measured right wheel speed.

In embodiments, the method includes checking, via the processor, if the following trailer state conditions are true based on measurements from a sensor system of the trailer and the vehicle: velocity of the vehicle is non-zero, driver steering input is about constant, yaw rate of the trailer is about constant, and hitch articulation angle is about constant. If the vehicle-trailer state conditions are true, determining, via the processor, a current yaw rate of the trailer, a current measured left wheel speed from the left wheel speed sensor and a current measured right wheel speed from the right wheel speed sensor under the trailer state conditions; determining, via the processor, the target yaw rate based on the current yaw rate; receiving, via the processor, a new measured left wheel speed from the left wheel speed sensor; receiving, via the processor, a new measured right wheel speed from the right wheel speed sensor; and determining, via the processor, the left braking torque based on a difference between the target left wheel speed and the new measured left wheel speed; and determining, via the processor, the right braking torque based on a difference between the target right wheel speed and the new measured right wheel speed.

In embodiments, the method includes displaying, on a Human Machine Interface (HMI), a depiction of the target path, wherein the depiction of the target path is generated based on the current yaw rate and including in the HMI a first user interface element for accepting the target path and a second user interface element for modifying the target path, wherein the current yaw rate is taken, by the processor, as the target yaw rate when a driver accepts the target path using the first user interface element, wherein the current yaw rate is modified by the processor according to a modified target path input by the driver using the second user interface element so as to provide a modified yaw rate, and wherein the modified yaw rate is taken, by the processor, as the target yaw rate.

In another aspect, a trailer is provided for towing by a vehicle. The trailer includes a left wheel, a right wheel, an axle. The left and right wheels are located on opposed ends of the axle. A left brake device is coupled to the left wheel, and a right brake device is coupled to the right wheel. A processor is configured to execute program instructions. The program instructions are configured to cause the processor to: receive differential braking commands from a control system of the vehicle; and command, based on the differential braking commands, application of a left braking torque by the left brake device and a right braking torque by the right brake device to assist maneuvering of the trailer along a target path.

In embodiments, the trailer includes a left wheel speed sensor coupled to the left wheel for measuring a left wheel speed and a right wheel speed sensor coupled to the right wheel for measuring a right wheel speed. The program instructions are configured to cause the processor to send the left wheel speed and the right wheel speed to the control system of the vehicle.

In a further aspect, a system is provided to assist maneuvering of a trailer being towed by a vehicle. The system includes the trailer and the vehicle. The trailer includes a left wheel, a right wheel, and an axle. The left and right wheels are located on opposed ends of the axle. A left brake device is coupled to the left wheel, and a right brake device is coupled to the right wheel. The system includes a processor configured to execute program instructions. The program instructions are configured to cause the processor to: receive a driver command for a target path for the trailer, determine a left braking torque for the left wheel and a right braking torque for the right wheel based on the target path so as to provide for differential braking, apply, via the left brake device and the right brake device, the left braking torque and the right braking torque to assist maneuvering of the trailer along the target path.

In embodiments, the driver command for the target path is derived from a driver input device of the vehicle.

In embodiments, the driver command for the target path is derived from a steering input device of the vehicle that sets a current path of the trailer and a second input device of the vehicle that modifies the current path to provide the target path.

In embodiments, the trailer includes a video capture device for videoing an external scene behind the trailer and providing a corresponding video feed. The second input device may be a Human Machine Interface (HMI) that receives and displays the video feed from the video capture device, integrates a depiction of the current path into the video feed for display and allows driver input of a modification to the current path.

In embodiments, the program instructions are configured to cause the processor to: determine a target trajectory for the target path, wherein determining the left brake torque and the right brake is based on the target trajectory for the target path.

In embodiments, the trailer comprises a left wheel speed sensor and a right wheel speed sensor and an Inertial Measurement Unit (IMU). The program instructions are configured to cause the processor to: receive a measured left wheel speed from the left wheel speed sensor; receive a measured right wheel speed from the right wheel speed sensor; determine a target yaw rate for the trailer based on the driver command; derive a target left wheel speed based on the target yaw rate; derive a target right wheel speed based on the target yaw rate; determine the left braking torque based on a difference between the target left wheel speed and the measured left wheel speed; and determine the right braking torque based on a difference between the target right wheel speed and the measured right wheel speed.

In embodiments, the program instructions are configured to cause the processor to: check if the following trailer state conditions are true based on measurements from a sensor system of the trailer and the vehicle: velocity of the vehicle is non-zero; driver steering input is about constant; yaw rate of the trailer is about constant; and hitch articulation angle is about constant. If the vehicle-trailer state conditions are true: determine a current yaw rate of the trailer, a current measured left wheel speed from the left wheel speed sensor and a current measured right wheel speed from the right wheel speed sensor under the trailer state conditions; determine the target yaw rate based on the current yaw rate; receive a new measured left wheel speed from the left wheel speed sensor; receive a new measured right wheel speed from the right wheel speed sensor; and determine the left braking torque based on a difference between the target left wheel speed and the new measured left wheel speed; and determine the right braking torque based on a difference between the target right wheel speed and the new measured right wheel speed.

In embodiments, the program instructions are configured to cause the processor to: display, on a Human Machine Interface (HMI) of the vehicle, a depiction of the target path, wherein the depiction of the target path is generated based on the current yaw rate; including, in the HMI, a first user interface element for accepting the target path and a second user interface element for modifying the target path, wherein the current yaw rate is taken, by the processor, as the target yaw rate when a driver accepts the target path using the first user interface element, wherein the current yaw rate is modified by the processor according to a modified target path input by the driver using the second user interface element so as to provide a modified yaw rate, and wherein the modified yaw rate is taken, by the processor, as the target yaw rate when the modified target path is input by driver using the second user interface element and accepted by the driver using the first user interface element.

In embodiments, the system comprises a plurality of trailers, each trailer comprising: a left wheel, a right wheel, and an axle. The left and right wheels are located on opposed ends of the axle. A left brake device is coupled to the left wheel, and a right brake device is coupled to the right wheel. The program instructions are configured to cause the processor to: receive a driver command for a target path for the plurality of trailers, and for each trailer: determine a left braking torque for the left wheel and a right braking torque for the right wheel based on the target path so as to provide for differential braking; and apply, via the left brake device and the right brake device, the left braking torque and the right braking torque to assist maneuvering of the trailer along the target path.

In embodiments, the trailer comprises a plurality of axles, a left wheel coupled to each axle and a right wheel coupled to each axle, a left brake device coupled to each of the left wheels, and a right brake device coupled to each of the right wheels. The program instructions are configured to cause the processor to: receive the driver command for the target path for the trailer, determine a left braking torque for each of the left wheels and a right braking torque for each of the right wheels based on the target path so as to provide for differential braking; and apply, via the left brakes and the right brakes, the respective left braking torque and the right braking torque to assist maneuvering of the trailer along the target path.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

The present disclosure provides methods and systems to control trailer braking torque for assisting maneuvering of the trailer. The systems and methods assist a driver while maneuvering a trailer with the use of active and independent brake torque at trailer axles. Maneuverability is increased by independently applying brake torque to different wheel corners while maneuvering. In embodiments, a trailer brake controller is used in conjunction with a control system of a towing vehicle to apply independent brake torque, by controlling brake hydraulic pressure, on the towed vehicle wheels for the purpose of increasing maneuverability by creating moment force on the towed vehicle, thus making it rotate on its axis. In one embodiment, a Human Machine Interface (HMI) displays a desired trailer path for acceptance or modification. A sliding bar, or other user interface (UI) element, allows a driver to modify the desired path (e.g. by influencing a target yaw rate of the trailer by adjusting gain on a current yaw rate). Differential braking commands can be calculated to achieve the modified desired path. In one example, a driver can slide a virtual bar in the HMI such that the further from a center of the sliding bar, the greater the gain adjustment.

Figure 1:
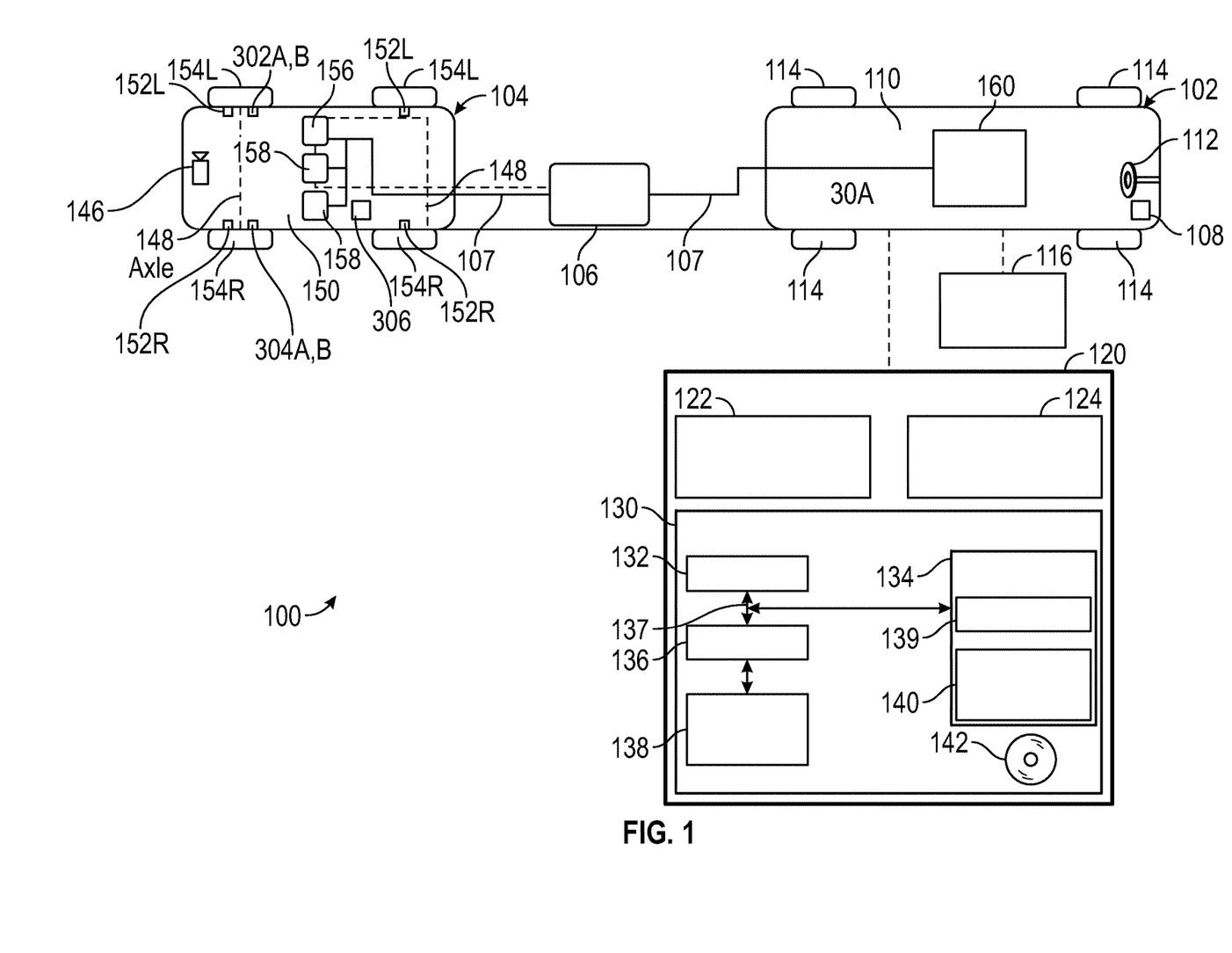
FIG. 1 is a functional block diagram of a trailer maneuver assist system that includes a vehicle and a trailer, in accordance with an exemplary embodiment.

FIG. 1 illustrates a trailer maneuver adjust system (or "system") 100 that includes a vehicle 102 (also referred to as tow vehicle 102) and a trailer 104. The vehicle 102 and the trailer 104 are connected together via a trailer interface module 106 and one or more connectors 107, so that the trailer 104 moves along with the vehicle 102 as the vehicle 102 is driven. As described in greater below, the system 100 includes a control system 120 that generates differential braking commands for brake devices 152L, 152R for assisting the trailer in following a target path. In various embodiments, the control system 120 is part of the vehicle 102, the trailer 104 or is distributed between the trailer 104 and the vehicle 102.

It will be appreciated that the vehicle 102 and trailer 104 may comprise any one or more of a number of different types of vehicles and trailers, respectively. For example, the vehicle 102 may be any one of a number of different types of automobiles and/or other vehicle types. For example, in various embodiments, the vehicle 102 may comprise a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or any one of a number of other types of vehicles. Similarly, the trailer 104 may be any one of a number of different types of trailers pulled and/or transported by such a vehicle 102, including, by way of example only, trailers used to transport other automobiles, boats or other marine vehicles, other vehicles, cargo, and/or other devices and/or systems. In the embodiment depicted in FIG. 1, the trailer has a pair of wheels 154L, 154R coupled to a respective first and second axle 148. However, trailers with just one axle 148 (see the example of FIG. 6) or more than two axles are envisaged.

As depicted in FIG. 1, the vehicle 102 includes, in addition to the above-referenced control system 120, a body 110, a steering input device 112 (e.g. a steering wheel 112), four wheels 114, a Human Machine Interface (HMI) 108 (or other driver input device), and a propulsion system 116. The body 110 substantially encloses the other components of the vehicle 102.

In the depicted embodiment, the wheels 114 are each disposed near a respective corner of the body 110. In various embodiments the vehicle 102 may differ from that depicted in FIG. 1. For example, in certain embodiments the number of wheels 114 may vary.

The propulsion system 116 powers the vehicle 102 via movement of the wheels 114. In various embodiments, the propulsion system 116 is part of an actuator assembly for powering movement of the vehicle. In one embodiment, the propulsion system 116 comprises one or more motors and/or engines, and drives the wheels 114.

Also as depicted in FIG. 1, in various embodiments, the trailer 104 includes a body 150, four wheels 154L, 154R, and a trailer Electronic Braking Control Module (EBCM) 156. In various embodiments, the body 150 substantially encloses the other components of the trailer 104. Also in various embodiments, the trailer 104 includes one or more other systems 158 (such as, by way of example, a lighting system, an environment control system, trailer hydraulic actuators, leveling jacks, and so on). In the depicted embodiment, the wheels 154 are each disposed near a respective corner of the body 150. In various embodiments, the number of wheels 154 may vary.

Also in various embodiments, the trailer EBCM 156 controls braking of the trailer 104. In various embodiments, the trailer EBCM 156 controls braking of the trailer 104 in accordance with instructions provided via the trailer interface module 106 and/or a processor 132 of the control system 120.

In various embodiments, as depicted in FIG. 1, the control system 120 comprises a sensor system 122, one or more transceivers 124, and a controller 131. The transceivers 124 may be part of the trailer interface module 106, although this is not shown in FIG. 1.

In various embodiments, the sensor system 122 includes sensors that measure and/or obtain information pertaining to one or more devices, systems, and/or components of the vehicle 102 and/or the trailer 104. In addition, in certain embodiments, the sensor system 122 includes wheel speed sensors 302A, 302B and 304A, 304B coupled to each wheel of the trailer 104 for measuring the respective rotational wheel speeds of the trailer 104. The sensor system 122 may include an Inertial Measure Unit (IMU) 306 for measuring inertial motion parameters of trailer 104 including yaw rate.

The sensor system 122 can include a hitch articulation angle sensor (not depicted) for measuring a hitch articulation angle between the trailer 104 and the vehicle 102. For example, ultra-sonic sensors can be provided to measure the hitch articulation angle, as disclosed in U.S. patent application Ser. No. 17/196,910. The sensor system 122 includes a vehicle velocity sensor (not shown) for measuring the speed of the vehicle (102). The sensor system 122 includes a steering input device sensor for measuring a steering command input by a driver using the steering input device 112, such as steering angle. Wheel speed from the wheel speed sensors 302A, 302B, 304A, 304B in particular is fed back to the control system 120, which compares the measured wheel speed to a target wheel speed derived from a target yaw rate (which itself is derived from a target path of the trailer 104) in order to determine a differential braking torque to be applied to the wheels 154L, 154R of the trailer 104 so that the measured wheel speed is brought into agreement with the target wheel speed, which serves to control the trailer 104 to follow the target path.

In various embodiments, the one or more transceivers 124 may facilitate communications between the vehicle 102 and the trailer 104, which communications may include instructions for differential braking and measured data from sensors of the sensor system 122 that are onboard the trailer 104 (e.g. the wheel speed sensors 302A, 302B, 304A, 304B and the trailer IMU 306). In certain embodiments, respective transceivers 124 may be disposed on the vehicle 102 and the trailer 104 and be in communicative contact with one another. In various embodiments, the transceiver 124 may comprise any number of receivers, transmitters, and/or transceivers.

In various embodiments, the control system 120 includes a controller 131 coupled to the sensor system 122 and the transceivers 124. Also in various embodiments, the controller 131 may further be coupled to the trailer EBCM 156, a vehicle EBCM 160, the other systems 158 (e.g. other trailer components), and/or one or more other components of the vehicle 102, the trailer 104, and/or the trailer interface module 106. Although not so depicted in FIG. 1, the vehicle EBCM 160 and the trailer EBCM 156 are included in the control system 120.

In various embodiments, the controller 131 determines a target path for the trailer based on a driver command input through the steering input device 112 and/or the HMI 108 (or other driver input device), receives motion data from the sensors of the trailer 104 and calculates differential braking commands to be applied to respective wheels 154L, 154R of the trailer 104 to assist maneuvering the trailer along the target path. In various embodiments, the controller 131 performs these and other functions in accordance with the that described further below in connection with FIGS. 2 to 7.

As depicted in FIG. 1, the controller 131 comprises a computer system. In certain embodiments, the controller 131 may also include one or more of a part, or an entirety, of each of: the sensor system 122, transceiver 124, the trailer interface module 106, the trailer EBCM 156, the vehicle EBCM 160, one or more other devices and/or systems, and/or components thereof. In addition, it will be appreciated that the controller 131 may otherwise differ from the embodiment depicted in FIG. 1. For example, the controller 131 may be coupled to or may otherwise utilize one or more remote computer systems and/or other control systems, and/or one or more other systems of the vehicle 102 and/or the trailer 104.

In the depicted embodiment, the computer system of the controller 131 includes a processor 132, a memory 134, an interface 136, a storage device 138, and a bus 137. The processor 132 performs the computation and control functions of the controller 131, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 139 contained within the memory 134 and, as such, controls the general operation of the controller 131 and the computer system of the controller 131, generally in executing the processes described herein.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 139 along with one or more stored values 140 (e.g., one or more predetermined thresholds used in connection with the processes described herein).

The bus 137 serves to transmit programs, data, status and other information or signals between the various components of the computer system of the controller 131. The interface 136 allows communication to the computer system of the controller 131, for example from a system driver and/or another computer system, and can be implemented using any suitable method and apparatus. In one embodiment, the interface 136 obtains the various data from the sensors of the sensor system 122. The interface 136 can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including direct access storage devices such as hard disk drives, flash systems, floppy disk drives and optical disk drives. In one exemplary embodiment, the storage device 138 comprises a program product from which memory 134 can receive a program 139 that executes one or more embodiments of one or more processes of the present disclosure (and any sub-processes thereof) described further below in connection with FIGS. 2 to 7. In another exemplary embodiment, the program product may be directly stored in and/or otherwise accessed by the memory 134 and/or a disk (e.g., disk 142), such as that referenced below.

The bus 137 can be any suitable physical or logical means of connecting computer systems and components. This includes, but is not limited to, direct hard-wired connections, fiber optics, infrared and wireless bus technologies. During operation, the program 139 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 131 may also otherwise differ from the embodiment depicted in FIG. 1, for example in that the computer system of the controller 131 may be coupled to or may otherwise utilize one or more remote computer systems and/or other control systems.

While the components of the control system 120 (including the sensor system 122, the transceiver 124, and the controller 131) are depicted as being part of the same system, it will be appreciated that in certain embodiments these features may comprise two or more systems. In addition, in various embodiments the control system 120 may comprise all or part of, and/or may be coupled to, various other devices and systems, such as, among others, the vehicle 102, the trailer 104 and/or one or more components and/or systems thereof.

Also as noted above, the connectors 107 physically connects the vehicle 102 with the trailer 104 and the trailer interface module 106 provides for two-way data communication between the vehicle 102 and the trailer 104. In various embodiments, both the vehicle 102 and the trailer 104 have respective connectors 107 (e.g., including various wires) for coupling the vehicle 102 and the trailer 104 together. In addition to data communication and mechanical coupling, the trailer 104 and the vehicle 102 are electrical power connected.

Figure 2:
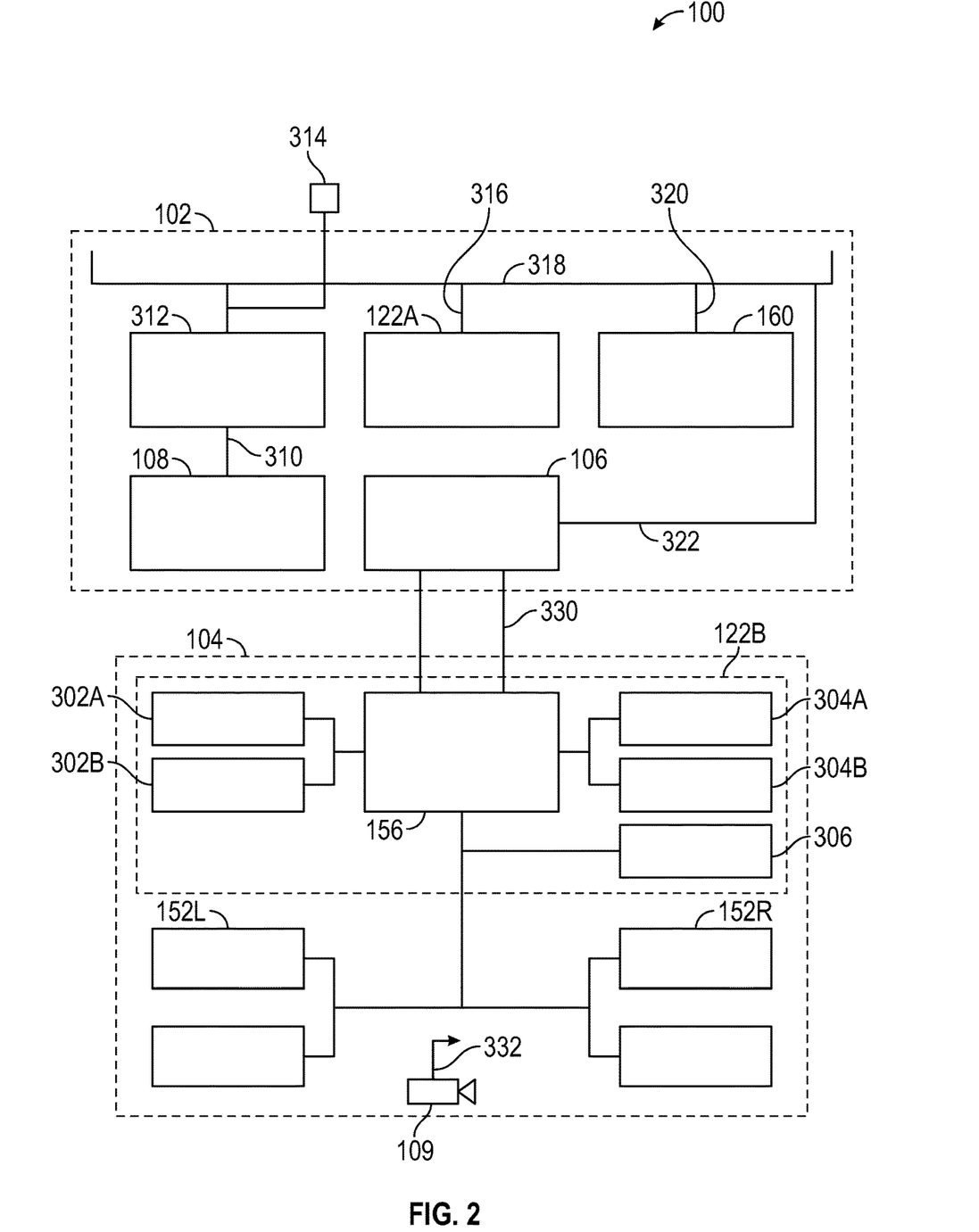
FIG. 2 is a functional block diagram of the trailer maneuver assist system, in accordance with an exemplary embodiment.

FIG. 2 is a functional block diagram showing various modules and systems of the trailer maneuver assist system 100 according to one example embodiment. The vehicle 102 includes the HMI 108 (or other driver input device), a target trajectory determination module 312, a vehicle sensor system 122A, the vehicle EBCM 160, a Controller Area Network bus 318, a video capture device 109 and the trailer interface module 106. The trailer 104 includes a trailer sensor system 122B, the trailer EBCM 156, and left trailer brake devices 152L and right trailer brake devices 152R. The vehicle and trailer sensor systems 122A, 122B are part of the sensor system 122 described above. The trailer sensor system 122B includes the wheel speed sensors 302A, 302B, 304A, 304B and the trailer IMU 306.

In one embodiment, the HMI 108 (or other user input device) allows a driver to command a trailer maneuver such as reversing along a curved path or a forward move like a corner cut. Although an HMI 108 is primarily described herein, particularly with reference to the example interface of FIG. 4, other driver input devices are envisaged. For example, a mechanical driver input device may allow steering commands for the trailer 104 (independent or additional to steering commands for the vehicle 102) to be input. Such a mechanical device could be in the form of a slider, a rotatable knob or wheel or buttons that allow entry of a direction of steering of the trailer during the maneuver. In another example, the control system 120 is able to automatically generate a target path based on a general command from the driver to reverse the trailer into a parking spot using a perception system (not depicted) associated with the vehicle 102 and the trailer 104. According to an HMI 108 example, a video feed 332 is provided from the video capture device 109 mounted at the back of the trailer 104. The video capture device 109 captures a video of an external scene rearward of the trailer to assist with reversing. The video feed 332 is provided to the HMI 108 via the trailer interface module 106. The HMI 108 includes a digital display device that displays the video of the external scene based on the video feed 332 optionally with graphical augmentations representing a current or target path for the vehicle. The HMI 108 may allow touch input for the driver so that a target path for the trailer can be defined. The target path may be defined based on selection of a plurality of target paths from the driver, by allowing the driver to draw the target path or by adjustment of a current path being followed by the trailer. Touch input is not required and any other user input device (e.g. a cursor control device) can be provided. The HMI 108 (or other user input device) receives an input from the driver as to a target (or desired) maneuver of the trailer and embodies the driver's intention for the maneuver into driver command data 310. The driver command data 310 may describe an acceptance of a current path being followed by the trailer 104, an adjustment to the current path, a target end location for the trailer 104, or a target path to follow.

In the exemplary embodiment of FIG. 2, the driver command data 310 is output to the target trajectory determination module 312, which determines one or more target trajectory parameters based on the driver command data 310. In one example, the target trajectory determination module 312 determines a target yaw rate for the trailer 104. In other embodiments, more detailed trajectories can be defined including curves having concave and convex portions, curvilinear paths, linear paths having adjacent segments that are angled relative to one another, etc. Such trajectories can be defined by target positions at points distributed along the target path, by yaw rate profiles and/or by other motion parameters (e.g. a speed profile). In one embodiment, the target trajectory determination module 312 receives a measured steering angle associated with the steering input device 112 of the vehicle 102 from the vehicle sensor system 122A as part of measured vehicle data 316. The target trajectory determination module 312 can determine a current path of the trailer 104 based on the steering angle and optionally other measured parameters of the vehicle 102 such as moving speed provided by the vehicle sensor system 122A. The current path can be displayed by the HMI 108 as a graphical augmentation to the displayed video. The user may adjust or accept the current path using the HMI 108 in providing a driver command. The target trajectory determination module 312 can determine the trailer motion parameters for the adjusted or accepted path in generating the target trajectory data 314.

The vehicle EBCM 160 receives measured trailer data 322 that is generated by the trailer sensor system 122B and sent to the vehicle EBCM 160 via the trailer interface module 106. The vehicle EBCM 160 further receives the target trajectory data 314. The measured trailer data 322 includes at least measured wheel speeds associated with each trailer wheel 154L, 154R and optionally yaw rate of the trailer from the trailer IMU 306. The vehicle EBCM 160 determines a differential braking program to achieve the target path set by the target trajectory data 314. The vehicle EBCM 160 is responsive to measured trailer data 322, provided in a feedback loop, to adjust the required differential braking. The vehicle EBCM 160 provides the determined differential braking commands to the trailer EBCM 156 in the form of braking data 130, via the trailer interface module 106. In one embodiment, the braking data 130 can include target wheel speeds or braking torques to be applied to each trailer wheel 154L, 154R. The braking torque applied at each trailer wheel 154L, 154R of the trailer 104 by the brake devices 152L, 152R can, and generally are, different in order to enhance control of maneuvering of the trailer 104 through use of differential braking. The braking data 330 is provided to the trailer EBCM 156, which sends differential braking devices to each of the brake devices 152L, 152R. It should be appreciated that a different distribution of tasks for determining the differential braking profile could be implemented between the vehicle EBCM 160 and the trailer EBCM 156. Indeed, just one central EBCM could be provided. The vehicle and trailer EBCMs 156, 160, and, more generally, the control system 120, together perform the processes described herein, namely: determining a target trajectory for a trailer maneuver based on a driver command entered through a driver input device and determining differential braking commands for trailer brake devices 152L, 152R to follow the target trajectory and making use of measured trailer data 322 in a feedback loop of redetermining differential braking commands to continue to follow the target path.

Figure 3:
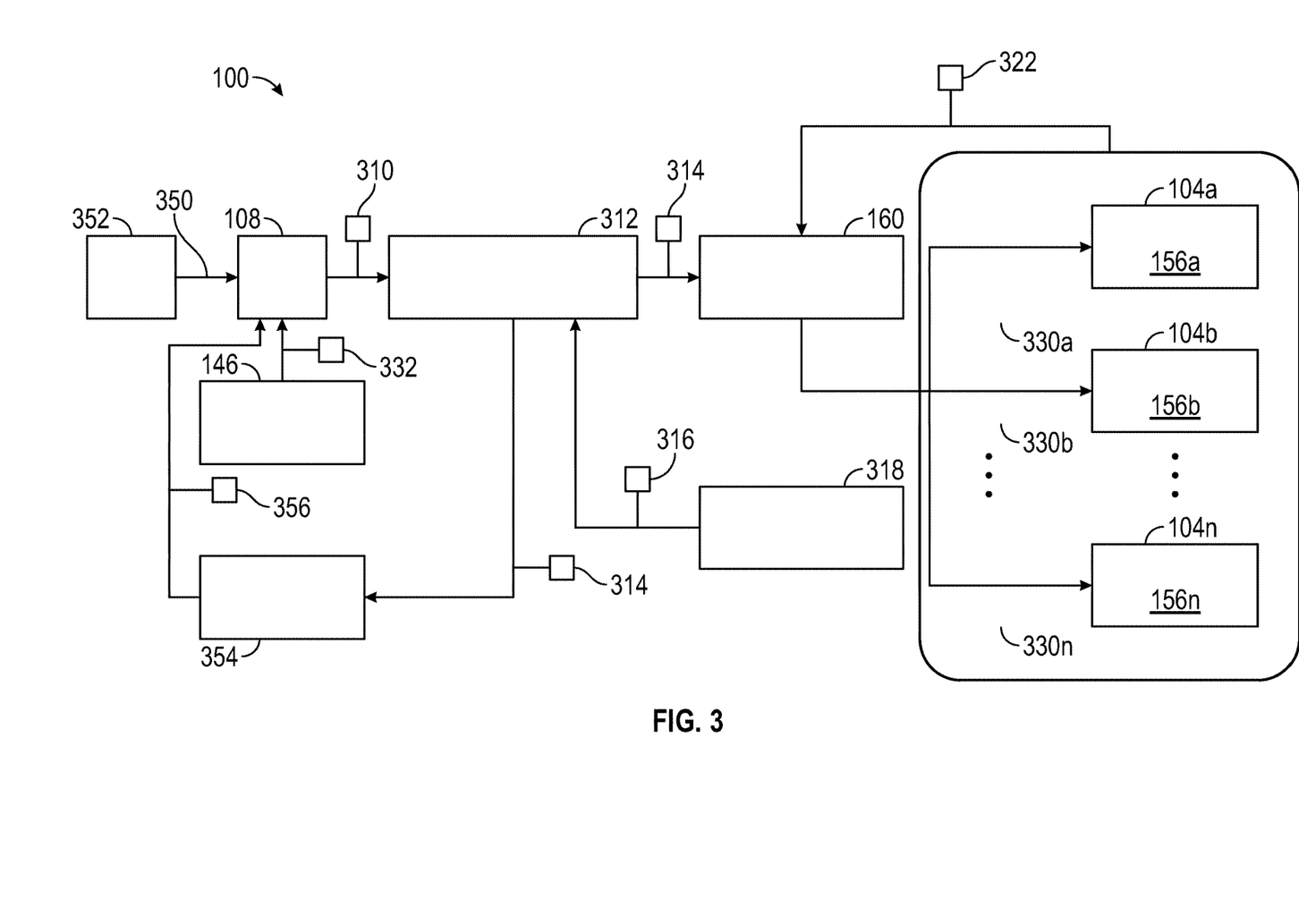
FIG. 3 is a diagram of data flow within the trailer maneuver assist system, in accordance with an exemplary embodiment.

FIG. 3 further illustrates the trailer maneuver assist system 100 according to an exemplary embodiment. The trailer maneuver assist system 100 includes the HMI (or driver input device) 108, the CAN bus 318, the vehicle EBCM (or vehicle braking module) 160, a plurality of trailers 104a, 104b . . . 104n, the target trajectory determination module 312, the video capture device 109 and an augmentation module 354. It should be appreciated that just one trailer 104 may also be provided. A human driver 352 interacts with the HMI 108 (which will be described further with reference to FIG. 4) to set a driver command for a trailer maneuver. The driver command can be acceptance of a current path being followed by the trailer(s), an adjustment to the current path, drawing of a path for the trailer(s) or a target destination for the trailer(s) 104a to 104n. In an exemplary embodiment, which will be described further with reference to FIG. 4, the video capture device 109 provides a video feed 332 to the HMI 108 for displaying an external scene of the trailer(s). The augmentation modules 354 graphically augments the displayed video to include a depiction of a target path for the trailer(s) based on target trajectory data 314 provided by the target trajectory determination module 312. The user is provided an option to accept the depicted path or to adjust the depicted path. The HMI 108 outputs driver command data 310 describing the command of the driver for a maneuver of the trailers 104a to 104n. The target trajectory determination module 312 receives measured vehicle data 316 provided over the CAN bus 318 from the vehicle sensor system 122A. The measured vehicle data 316 can include vehicle speed and steering wheel angle, which allow a maneuver of the trailers 104a to 104n to be projected, thereby establishing a current or predicted path of the trailers 104a to 104n. The current or predicted path is embodied in target trajectory data 314 and used by the augmentation module 354 to depict the current or predicted path. The driver can accept the current or predicted path or can adjust the path by entering a driver command. The target trajectory determination module 312 re-calculates the target path based on the driver command data 310 requesting adjustment of the current or predicted path. The new target trajectory data 314 (which may include a target yaw rate for the trailers 104a to 104n) is output to the augmentation module 354 for display and to the vehicle EBCM 160 for generating differential braking commands.

The vehicle EBCM 160 receives measured trailer data 322 including a current hitch articulation angle. The current hitch articulation angle can be used by the vehicle EBCM 160 as part of a check for trailer state conditions, which will be described further below with respect to FIG. 7. The vehicle EBCM 160 determines braking information describing an amount of braking to apply to each wheel 154 of each trailer 104a to 104n. In one embodiment, the vehicle EBCM 160 determines a target wheel speed for each wheel, which is sent to the trailer EBCMs 156a to 156n associated with each trailer 104a to 104n. The trailer EBCMs 156a to 156n receive braking data 330a to 330n from the vehicle EBCM 160, which controls application of braking torque through the various trailer brake devices 152L, 152R. In some embodiments, the braking data 330a to 330n provided by the vehicle EBCM 160 is in the form of braking torque or target wheel speeds. In the latter case, the trailer EBCMs 156a to 156n determine braking torque based on a difference between the target wheel speeds and measured wheel speeds obtained from the wheels speed sensors 302A, 302B, 304A, 304B.

Figure 4:
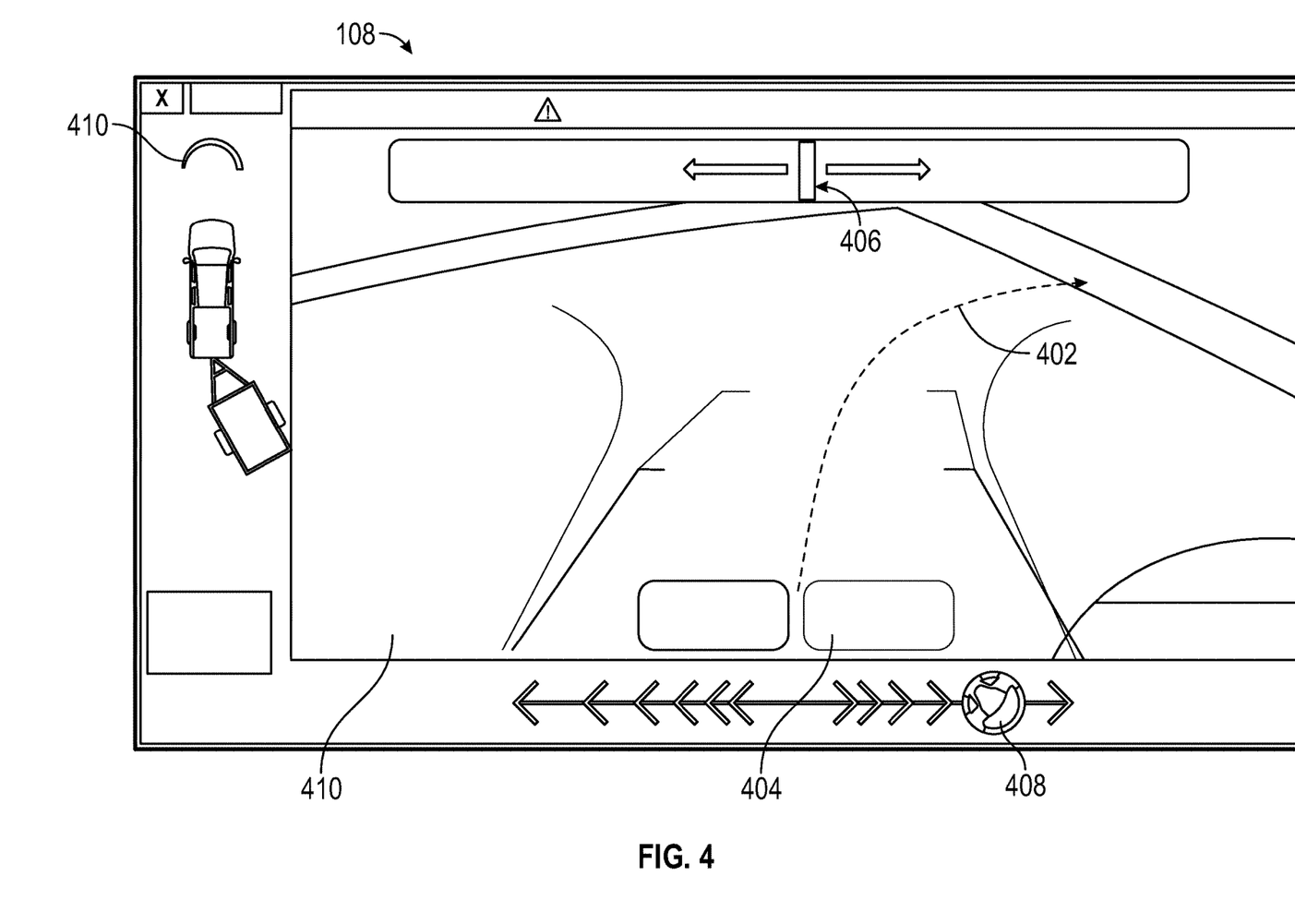
FIG. 4 is a human machine interface depicting a target trajectory and user interface elements for accepting and modifying the target trajectory, in accordance with an exemplary embodiment.

An exemplary HMI 108 is depicted in FIG. 4, which is in accordance with the present disclosure. As already noted herein, other forms of driver input device could be provided including a mechanical version. The HMI 108 may be displayed on a display device integrated in the vehicle 102 or in the trailer 104. In other embodiments, the HMI 108 is displayed on a portable display device such as a tablet device or a smart phone. The HMI 108 includes a video feed window 410 for displaying live video from a scene around (e.g. rearward) the trailer obtained by the video capture device 109. Further, a depiction of the current/modified/target path 402 is included in the video feed window 410 to depict a projected travel path of the trailer. The depiction is of a current path when it is initially projected based on the steering input from the steering input device 112 and the speed of the vehicle 102 (or the speed of the trailer 104). The depiction is of an adjusted path when the current path is adjusted by the driver through a path modification UI element 406. The depiction becomes a target path when accepted by the driver using the accept UI element 404. The depiction of the current/modified/target path 402 is generated by the augmentation module 354 based on target trajectory data 314, which can include yaw rate as described further below with reference to FIG. 7. In one embodiment, the path modification UI element 406 is a slider bar allowing left and right bias of the current path, which can set an adjusted yaw rate as will be described with reference to FIG. 7. Other UI elements than a slider bar can be implemented such as adjustment arrows. In other embodiments, the path can be adjusted by dragging or re-drawing the depiction of the current/modified/target path 402 by touch or cursor controlled input to the HMI 108. In alternative embodiments, a target destination for the trailer 104 can be selected through the HMI 108 by the driver. The adjustments made by the driver result in the target trajectory data 314 being adjusted so that the HMI 108 can display an adjusted depiction of the current/modified/target path 402 and so that the vehicle EBCM can determine braking data 330 resulting in the trailer 104 following the target path. In one embodiment, the HMI 108 includes a bias indication element 408 that moves along a scale depending on the amount of left or right bias input by the user through the path modification UI element 406 to indicate a magnitude of bias that will be applied to the current path of the trailer 104 through the use of differential braking.

Figure 5:
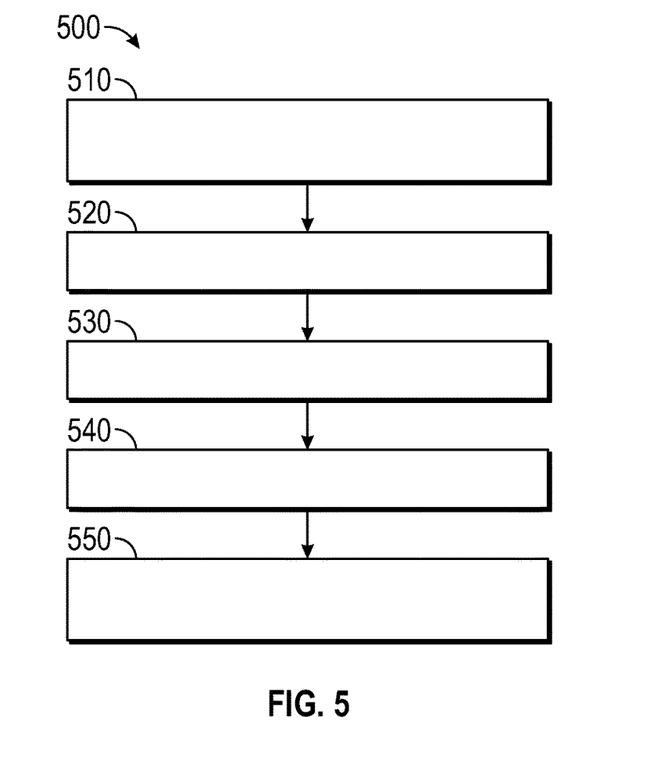
FIG. 5 is a flowchart of a process for assisting maneuvering of a trailer using differential braking in the trailer assist system of FIG. 1, in accordance with an exemplary embodiment.

FIG. 2 is a flowchart of a method 500 of assisting a trailer maneuver such as a reversing maneuver, in accordance with exemplary embodiments. In various embodiments, the method 500 may be implemented in connection with the vehicle 102, the trailer 104, and the control system 120 thereof.

In step 510, a driver command for a target path is received. The driver command may be entered through the HMI 108 or another driver input device. The driver command can include acceptance of the depiction of current/modified/target path 402 as discussed with respect to FIG. 4. The driver command may also be a driver drawn target path, a selection of one of a plurality of target paths, an adjustment to a current path, a selection of a destination space for the trailer 104, etc.

In step 520, a target trajectory is determined for the purpose of generating the depiction of the current/modified/target path 402 and for determining braking data 330. The target trajectory may include a yaw rate for the trailer 104. In one embodiment, the target trajectory includes a current yaw rate determined based on the measured vehicle data 316 and/or the measured trailer data 322 and may also include a left or right adjustment bias set based on driver input through the HMI 108.

In step 530, the measured trailer data 322 is received by the vehicle EBCM 160. The vehicle braking module 160 determines differential braking data 330 in step 540 based on the measured trailer data 322 (including measured wheels speeds) and the target trajectory. The target trajectory allows target wheel speeds to be derived and the target wheels speeds can be compared to the measured wheels speeds to determine braking torques that should be applied in order to minimize the difference between the target and measured wheels speeds.

In step 550 differential braking torque is applied to the trailer wheels 154L, 154R based on the differential braking data from step 540. The differential braking is applied to more accurately guide the trailer 104 along the target path than would, generally, be possible by controlling the trailer 104 exclusively through maneuvering the vehicle 102 or by evenly applying braking torque.

Figure 6:
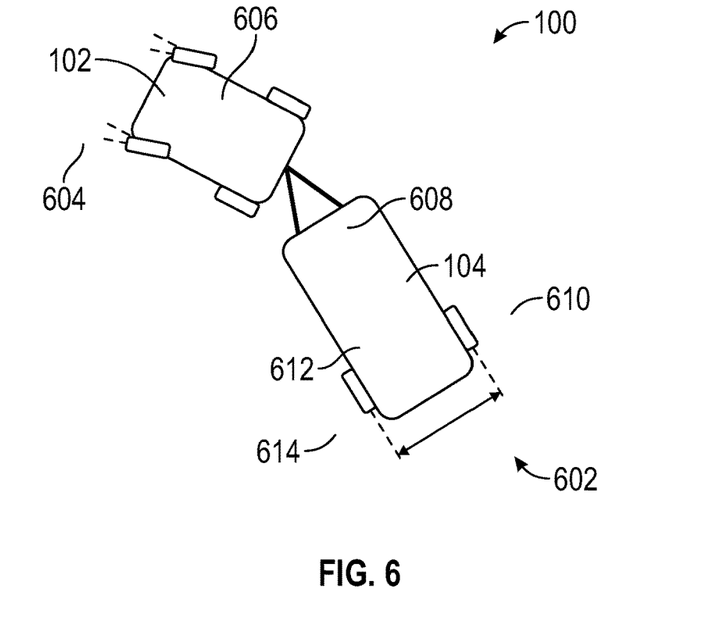
FIG. 6 is a functional block diagram of a vehicle and a trailer, in accordance with an exemplary embodiment.
Figure 7A:
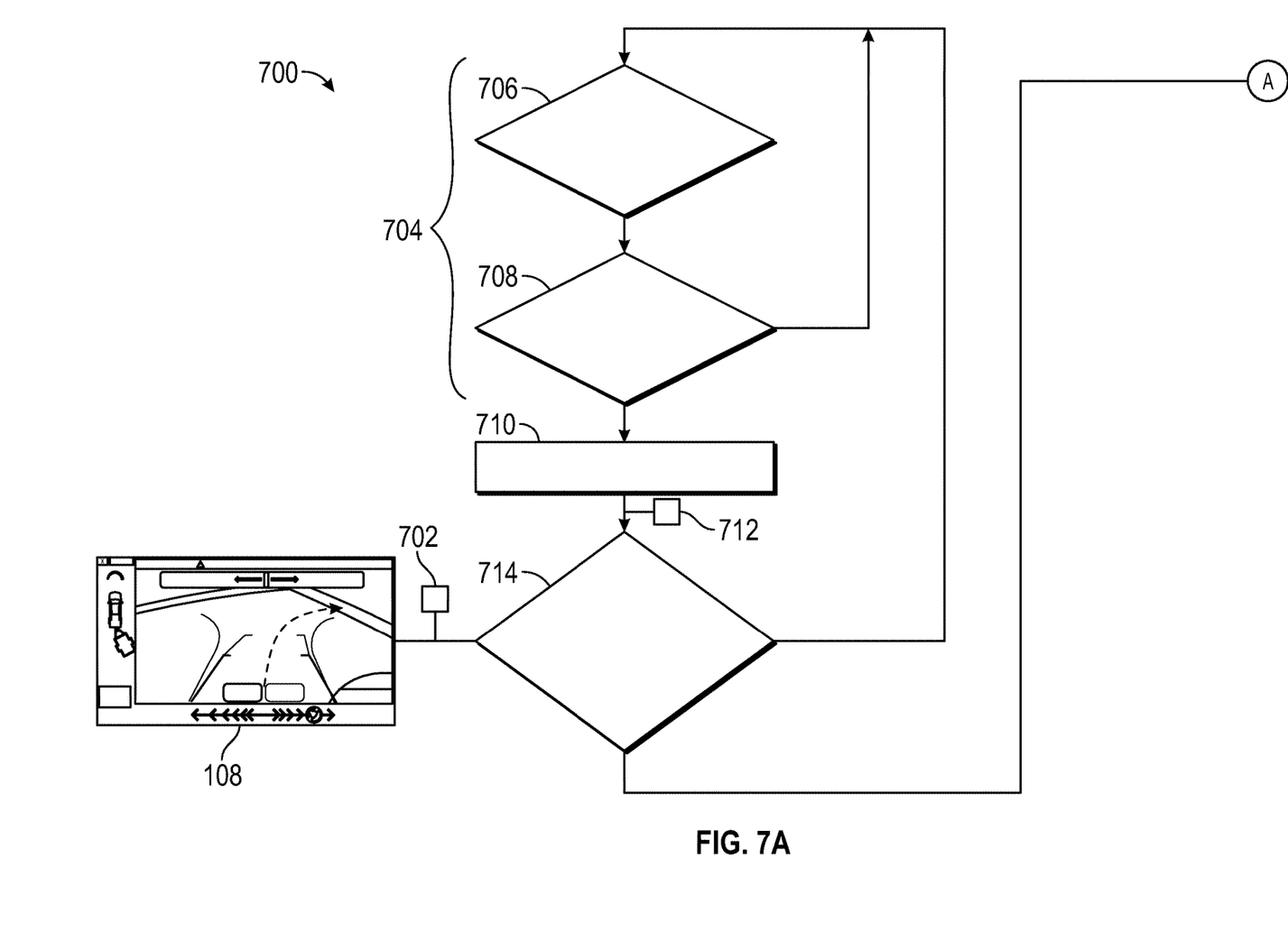
FIG. 7 is a flowchart of a process for assisting maneuvering of a trailer using differential braking in the trailer maneuver assist system of FIG. 1, in accordance with an exemplary embodiment.
Figure 7B:
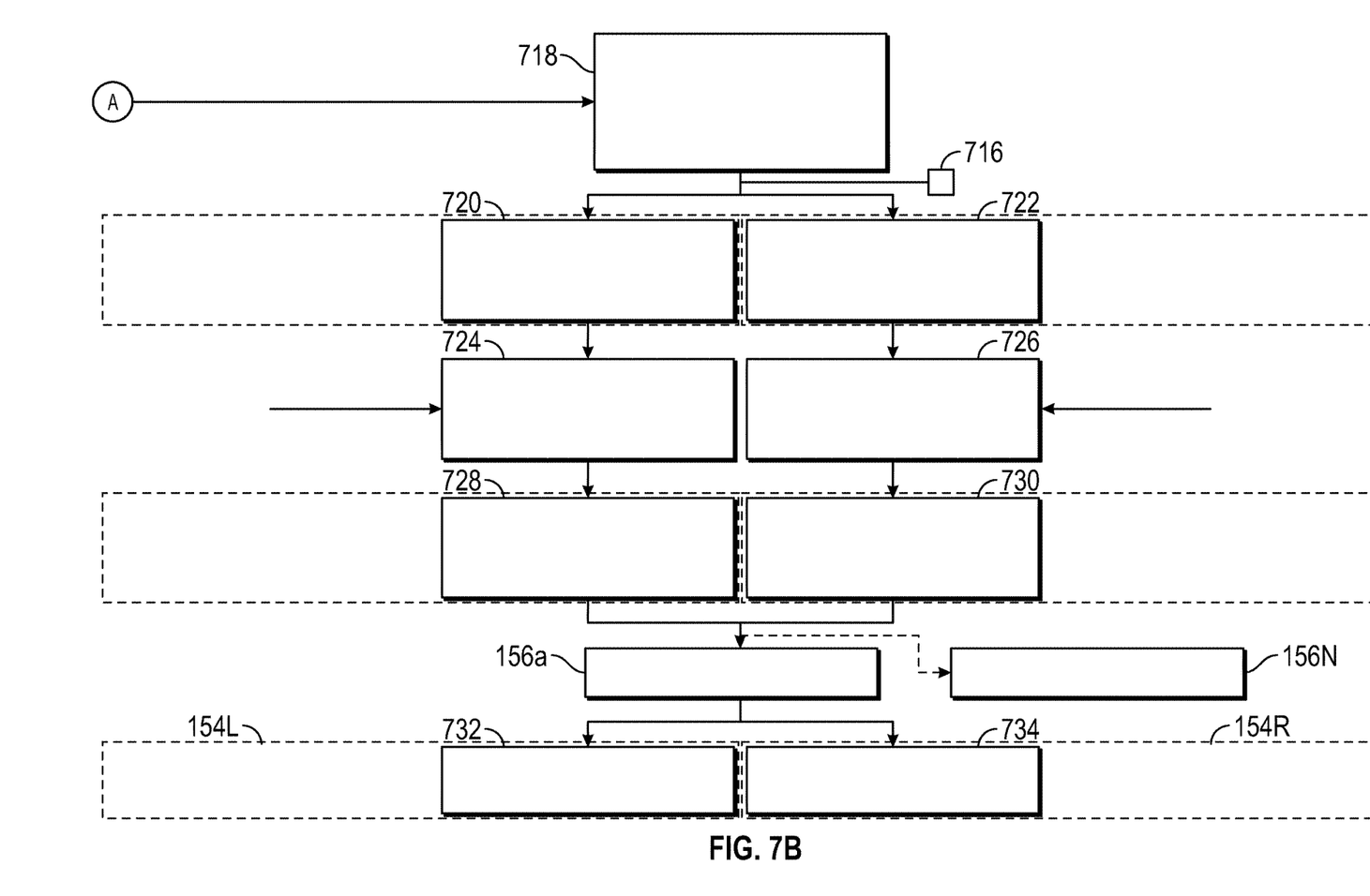

A more detailed method 700 for assisting a trailer maneuver in a trailer maneuver assist system 100 is outlined in FIGS. 6 and 7, in accordance with an exemplary embodiment. FIG. 6 illustrates various parameters of the trailer maneuver assist system 100 that are referenced in the method 700 of FIG. 7. The vehicle 102 has a front wheel angle 604 ($\delta_f$) and a vehicle longitudinal velocity 607 ($v_v$). The front wheel angle 606 and the vehicle longitudinal velocity 607 is available from the vehicle sensor system 122A as discussed above. Further illustrated in FIG. 6 is a hitch articulation angle 608 ($\theta$) between the vehicle 102 and the trailer 104. The trailer 104 has left and right rotational wheel speeds 614, 610 ($\omega_{tl}$, $\omega_{tr}$), a trailer track width 602 ($D_t$) and a trailer yaw rate 612 ($\dot\psi$). The wheel rotational speeds 614, 610, the hitch articulation angle 608 and the trailer yaw rate 612 are available from the sensor system 122 as discussed above and the trailer track width 602 is one of the stored values 140 in memory 134.

Referring to FIG. 7, method 700 includes step 704 of checking trailer state conditions 704. The trailer state conditions include checking, in step 706, if the vehicle velocity is nonzero ($|v_v|>Th2$) and the driver steering input is almost constant ($|\dot\delta_f|<Th1$), where $\dot\delta_f$ is the vehicle front road wheel angle rate. The check of step 706 provides an indication that the driver is intending a trailer maneuver that may be assisted by the trailer maneuver assist system 100 described herein. In step 708, a check is made that the yaw-rate of the trailer ($|\dot\psi_t|<Th3$) or the hitch articulation angle ($|\dot\theta|<Th4$) is almost constant. The thresholds Th1, Th2, Th3, Th4 are calibratable parameters and are generally close to zero. Step 708 provides an indication that the trailer motion is in a steady state condition for the given constant steering input and speed. When the checks of step 704 are confirmed to be true, method 700 proceeds to step 710 whereby the measured current yaw-rate 712 of the trailer 104 is taken as the target yaw-rate for the trailer 104 ($\dot\psi_{ttarget}$=calculated $\dot\psi_t$). The HMI 108 is produced including the video feed window 410 and a depiction of current/modified/target path 402 that has been generated based on the target yaw rate assumption from step 710.

In embodiments, the driver can enter a driver command 702 through the HMI 108 to accept the current path (step 714) using the accept UI element 404 or to adjust the current path (step 718) using the path modification UI element 406. In one embodiment, the adjustment to the current path applies a gain ($K_{HMI}$) to modify the current trailer yaw rate ($\dot\psi_{t_{gained}}=K_{HMI}\dot\psi_t$), where the gain is determined based on the degree of right or left bias commanded by the driver through the path modification UI element 406. The HMI 108 is updated with an adjusted depiction of the current/modified/target path 402, which the driver may be asked to accept (using accept UI element 404) before proceeding. The current or adjusted path corresponds to a target yaw rate 716 ($\dot\psi_{ttarget}$), which is used in subsequent steps of method 700 for determining differential braking torque to be applied to the wheels of the trailer 104.

In steps 720 and 722, the target rotational speed for the left and right wheels, respectively, are calculated based on the target yaw rate 716. The target wheel rotational speeds can be determined according to the following equations:

For the right wheel of the trailer 104:

$$\omega_{trtarget} = \frac{1}{R_{eff}}(v_t + 0.5 D_t \dot\psi_{ttarget}) \qquad \text{(equation 1)}$$

For the left wheel of the trailer 104:

$$\omega_{tltarget} = \frac{1}{R_{eff}}(v_t - 0.5 D_t \dot\psi_{ttarget}) \qquad \text{(equation 2)}$$

In equations 1 and 2, $R_{eff}$ is the effective rolling tire radius and is one of stored values 140 in memory 134.

In steps 724, 726, the left and right rotational wheel speeds of the trailer 104 are measured. In steps 728 and 730, the brake torque ($|BT_{l,r}|$) is determined based on a difference (or error) between the target rotational wheel speeds ($|\omega_{tl,trtarget}|$) from steps 720 and 722 and the measured rotational wheel speeds ($|\omega_{tl,tr}|$) from steps 728 and 730. Exemplary equations for calculating brake torque are:

For the right wheel of the trailer 104:

$$BT_r = K(\omega_{tr} - \omega_{trtarget}) \qquad \text{(equation 3)}$$

For the left wheel of the trailer 104:

$$BT_l = K(\omega_{tl} - \omega_{tltarget}) \qquad \text{(equation 4)}$$

where K is a calibratable constant or function.

In steps 720 to 730 of method 700, an example is taken where there are two trailer wheels 154L, 154R included in the trailer 104 and respective algorithmic pipelines that determine target braking speeds from the yaw rate and target brake torques for each wheel. In other embodiments, there may be four or more wheels included in the trailer 104, in which case further parallel pipelines would be included for calculating the brake torque for each wheel.

The brake torque from steps 728, 730 is provided to the trailer EBCM 156. In some embodiments, the method 700 may determine differential brake torques for each of a plurality of trailers (trailer$_1$ to trailer$_N$), which would be provided to respective trailer EBCMs 156$_a$ to 156$_N$. The trailer EBCM 156 controls application of the requested brake torque by applying the brake pressure, using the brake devices 152L, 152R, to each trailer wheel 154L, 154R in steps 732, 734.

It will be appreciated that the disclosed methods and systems may vary from those depicted in the Figures and described herein. For example, the system 100, the vehicle 102, the trailer 104, and the control system 120, and/or various components thereof, may differ from that depicted in FIG. 1 and described in connection therewith. In addition, it will be appreciated that certain steps of the methods 500, 700 may vary from those depicted in FIGS. 5 and 7 and/or described above in connection therewith. It will similarly be appreciated that certain steps of the methods 500, 700 described above may occur simultaneously or in a different order than that depicted in FIGS. 5 and 7 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method to assist maneuvering of a trailer being towed by a vehicle, the trailer comprising:
   a left wheel;
   a right wheel;
   an axle;
   the left and right wheels on opposed ends of the axle;
   a left brake device coupled to the left wheel;
   a right brake device coupled to the right wheel;
   a left wheel speed sensor;
   a right wheel speed sensor; and
   the method comprising:
      receiving, via at least one processor, a driver command for a target path for the trailer;
      receiving, via the at least one processor, a measured left wheel speed from the left wheel speed sensor;
      receiving, via the at least one processor, a measured right wheel speed from the right wheel speed sensor;
      determining, via the at least one processor, a target yaw rate for the trailer based on the driver command;
      deriving a target left wheel speed based on the target yaw rate;
      deriving a target right wheel speed based on the target yaw rate;
      determining, via the at least one processor, a left braking torque for the left wheel and a right braking torque for the right wheel based on the target path so as to provide for differential braking, wherein the determining the left braking torque is based on a difference between the target left wheel speed and the measured left wheel speed, and wherein the determining the right braking torque is based on a difference between the target right wheel speed and the measured right wheel speed;
      applying, via the left brake device and the right brake device, the left braking torque and the right braking torque to assist maneuvering of the trailer along the target path.

2. The method of claim 1, wherein the driver command for the target path is derived from at least one driver input device of the vehicle.

3. The method of claim 1, wherein the driver command for the target path is derived from a steering input device of the vehicle that sets a current path of the trailer and a second input device of the vehicle that modifies the current path to provide the target path.

4. The method of claim 3, wherein the trailer includes a video capture device for videoing an external scene behind the trailer and providing a corresponding video feed, and wherein the second input device is a Human Machine Interface (HMI) that receives and displays the video feed from the video capture device, integrates a depiction of the current path into the video feed for display and allows driver input of a modification to the current path.

5. The method of claim 1, comprising determining, via the at least one processor, a target trajectory for the target path, wherein determining the left braking torque and the right braking torque is based on the target trajectory for the target path.

6. The method of claim 1, comprising:
   checking, via the at least one processor, if at least one of following trailer state conditions are true based on measurements from a sensor system of the trailer and the vehicle:
   velocity of the vehicle is non-zero;
   driver steering input is about constant;
   yaw rate of the trailer is about constant;
   hitch articulation angle is about constant; and
   if all vehicle-trailer state conditions above are true:
      determining, via the at least one processor, a current yaw rate of the trailer, a current measured left wheel speed from the left wheel speed sensor and a current measured right wheel speed from the right wheel speed sensor under the vehicle-trailer state conditions;
      determining, via the at least one processor, the target yaw rate based on the current yaw rate;
      receiving, via the at least one processor, a new measured left wheel speed from the left wheel speed sensor;
      receiving, via the at least one processor, a new measured right wheel speed from the right wheel speed sensor; and
      determining, via the at least one processor, the left braking torque based on a difference between the target left wheel speed and the new measured left wheel speed; and
      determining, via the at least one processor, the right braking torque based on a difference between the target right wheel speed and the new measured right wheel speed.

7. The method of claim 6, comprising displaying, on a Human Machine Interface (HMI), a depiction of the target path, wherein the depiction of the target path is generated based on the current yaw rate and including in the HMI a first user interface element for accepting the target path and a second user interface element for modifying the target path, wherein the current yaw rate is taken, by the at least one processor, as the target yaw rate when a driver accepts the target path using the first user interface element, wherein the current yaw rate is modified by the at least one processor according to a modified target path input by the driver using the second user interface element so as to provide a modified yaw rate, and wherein the modified yaw rate is taken, by the at least one processor, as the target yaw rate.

8. A trailer for towing by a vehicle, the trailer comprising:
   a left wheel;
   a right wheel;
   an axle;
   the left and right wheels on opposed ends of the axle;
   a left brake device coupled to the left wheel;
   a right brake device coupled to the right wheel;
   a left wheel speed sensor;
   a right wheel speed sensor; and
   at least one processor configured to execute program instructions, wherein the program instructions are configured to cause the at least one processor to:
      receive differential braking commands from a control system of the vehicle; and
      command, based on the differential braking commands, application of a left braking torque by the left brake device and a right braking torque by the right brake device to assist maneuvering of the trailer along a target path,
      wherein the left braking torque is based on a difference between a target left wheel speed and a measured left wheel speed from the left wheel speed sensor, and wherein the right braking torque is based on a difference between a target right wheel speed and a measured right wheel speed from the right wheel speed sensor, ad wherein the target left wheel speed and the target right wheel speed are based on a target yaw rate that is based on the driver command.

9. The trailer of claim 8, comprising a left wheel speed sensor coupled to the left wheel for measuring a left wheel speed and a right wheel speed sensor coupled to the right wheel for measuring a right wheel speed, wherein the program instructions are configured to cause the at least one processor to send the left wheel speed and the right wheel speed to the control system of the vehicle.

10. A system to assist maneuvering of a trailer being towed by a vehicle, the system comprising:
    the trailer;
    the vehicle;
    the trailer comprising:
       a left wheel;
       a right wheel;
       an axle;
       the left and right wheels on opposed ends of the axle;
       a left brake device coupled to the left wheel;
       a right brake device coupled to the right wheel;
       a left wheel speed sensor;
       a right wheel speed sensor; and
       the system comprising at least one processor configured to execute program instructions, wherein the program instructions are configured to cause the at least one processor to:
          receive a driver command for a target path for the trailer;
          receive a measured left wheel speed from the left wheel speed sensor;
          receive a measured right wheel speed from the right wheel speed sensor;
          determine a target yaw rate for the trailer based on the driver command;
          derive a target left wheel speed based on the target yaw rate;
          derive a target right wheel speed based on the target yaw rate;
          determine a left braking torque for the left wheel and a right braking torque for the right wheel based on the target path so as to provide for differential braking, wherein the left braking torque is determined based on a difference between the target left wheel speed and the measured left wheel speed, and wherein the right braking torque is determined based on a difference between the target right wheel speed and the measured right wheel speed;
          apply, via the left brake device and the right brake device, the left braking torque and the right braking torque to assist maneuvering of the trailer along the target path.

11. The system of claim 10, wherein the driver command for the target path is derived from at least one driver input device of the vehicle.

12. The system of claim 10, wherein the driver command for the target path is derived from a steering input device of the vehicle that sets a current path of the trailer and a second input device of the vehicle that modifies the current path to provide the target path.

13. The system of claim 12, wherein the trailer includes a video capture device for videoing an external scene behind the trailer and providing a corresponding video feed, and wherein the second input device is a Human Machine Interface (HMI) that receives and displays the video feed from the video capture device, integrates a depiction of the current path into the video feed for display and allows driver input of a modification to the current path.

14. The system of claim 10, wherein the program instructions are configured to cause the at least one processor to: determine a target trajectory for the target path, wherein determining the left braking torque and the right braking torque is based on the target trajectory for the target path.

15. The system of claim 10, wherein the program instructions are configured to cause the at least one processor to:
    check if at least one of following trailer state conditions are true based on measurements from a sensor system of the trailer and the vehicle:
       velocity of the vehicle is non-zero;
       driver steering input is about constant;
       yaw rate of the trailer is about constant; and
       hitch articulation angle is about constant; and
    if all vehicle-trailer state conditions are true:
       determine a current yaw rate of the trailer, a current measured left wheel speed from the left wheel speed sensor and a current measured right wheel speed from the right wheel speed sensor under the vehicle-trailer state conditions;
       determine the target yaw rate based on the current yaw rate;
       receive a new measured left wheel speed from the left wheel speed sensor;
       receive a new measured right wheel speed from the right wheel speed sensor; and determine the left braking torque based on a difference between the target left wheel speed and the new measured left wheel speed; and determine the right braking torque based on a difference between the target right wheel speed and the new measured right wheel speed.

16. The system of claim 15, wherein the program instructions are configured to cause the at least one processor to:

display, on a Human Machine Interface (HMI) of the vehicle, a depiction of the target path, wherein the depiction of the target path is generated based on the current yaw rate;

including, in the HMI, a first user interface element for accepting the target path and a second user interface element for modifying the target path, wherein the current yaw rate is taken, by the at least one processor, as the target yaw rate when a driver accepts the target path using the first user interface element, wherein the current yaw rate is modified by the at least one processor according to a modified target path input by the driver using the second user interface element so as to provide a modified yaw rate, and wherein the modified yaw rate is taken, by the at least one processor, as the target yaw rate when the modified target path is input by driver using the second user interface element and accepted by the driver using the first user interface element.

17. The system of claim 10, comprising a plurality of trailers, each trailer comprising:

a left wheel;
a right wheel;
an axle;
the left and right wheels on opposed ends of the axle;
a left brake device coupled to the left wheel; and
a right brake device coupled to the right wheel; wherein the program instructions are configured to cause the at least one processor to:

receive a driver command for a target path for the plurality of trailers;

for each trailer:
determine a left braking torque for the left wheel and a right braking torque for the right wheel based on the target path so as to provide for differential braking;
apply, via the left brake device and the right brake device, the left braking torque and the right braking torque to assist maneuvering of the trailer along the target path.

18. The system of claim 10, wherein the trailer comprises a plurality of axles, a left wheel coupled to each axle and a right wheel coupled to each axle, a left brake device coupled to each of the left wheels, and a right brake device coupled to each of the right wheels, wherein the program instructions are configured to cause the at least one processor to:

receive the driver command for the target path for the trailer;

determine a left braking torque for each left wheel and a right braking torque for each right wheel based on the target path so as to provide for differential braking;

apply, via the left brake device and the right brake device, the respective left braking torque and the right braking torque to assist maneuvering of the trailer along the target path.

19. The method of claim 1, wherein the trailer further comprises an Inertial Measurement Unit (IMU) that provides measured yaw rate data, and wherein the target yaw rate is determined based on the yaw rate data.

20. The system of claim 10, wherein the trailer further comprises an Inertial Measurement Unit (IMU) that provides measured yaw rate data, and wherein the target yaw rate is determined based on the yaw rate data.

* * * * *